United States Patent [19]
Ercoli et al.

[11] 3,755,302
[45] Aug. 28, 1973

[54] PROCESS FOR THE PRODUCTION OF 17-MONESTERS OF 17α, 21-DIHYDROXY-STEROIDS AND PRODUCTS THEREOF

[75] Inventors: Alberto Ercoli, Milano; Rinaldo Gardi, Carate Brianza; Romano Vitali, Casatenovo, all of Italy

[73] Assignee: Warner-Lambert Pharmaceutical Company, Morris Plains, N.J.

[22] Filed: June 22, 1970

[21] Appl. No.: 48,481

[30] Foreign Application Priority Data
June 26, 1969 Italy .................. 18717/A69

[52] U.S. Cl .............. 260/239.55 R, 260/239.55 D, 260/397.45, 260/397.47
[51] Int. Cl. ............................. C07c 173/00
[56] References Cited
UNITED STATES PATENTS 3,529,060  9/1970  Ercoli et al. .................. 260/424
3,345,387  10/1967  Taub et al. .................. 260/397.45
3,499,081  3/1970  Krakower .................. 424/241
3,455,968  7/1969  Herzog .................. 260/349
2,897,216  7/1959  Obveto et al. .................. 260/397.45

FOREIGN PATENTS OR APPLICATIONS 1,070,751  6/1967  Great Britain .................. 260/397.45

Primary Examiner—Elbert L. Roberts
Attorney—Albert H. Graddis, Henry E. Millson, Jr., Frank S. Chow, Neil D. Edwards and Anne M. Kelly

[57] ABSTRACT

This invention relates to an improved process for the preparation of 17-monoesters of 17α, 21-dihydroxy-20-keto-steroids which consists in carrying out the hydrolysis of corresponding 17,21-cyclic orthoesters in a buffered aqueous-organic medium at a pH from about 4 to about 6. This invention also relates to new 17-esters of 17α, 21-dihydroxy-steroids having an epoxy group at the 9β, 11β-position, useful as intermediates for the preparation of therapeutically active 17-esters.

20 Claims, No Drawings

PROCESS FOR THE PRODUCTION OF 17-MONESTERS OF 17α, 21-DIHYDROXY-STEROIDS AND PRODUCTS THEREOF

The present invention relates to an improved process for the preparation of 17-monoesters of 17α,21-dihydroxy-20-keto-steroids of the pregnane series and to novel 17-monoesters obtained thereby.

It is known from U.S. Pat. No. 3,152,154 that the 17-monoesters of 17α,21-dihydroxy-20-keto-steroids can be easily prepared by acid hydrolysis of corresponding 17,21-cyclic orthoesters. This reaction which is preferably carried out in the presence of a mineral or organic acid and in an alcoholic medium at a temperature ranging from room temperature to the boiling point of the alcohol employed, gives the desired 17-monoester in good yield. However, it has been noted that during the hydrolysis of the 17,21-orthoester there is formed besides the desired 17-ester a certain amount of the corresponding 21-monoester, either as primary reaction by-product or as result of a rearrangement of the primarily formed 17-monoester (Tetrahedron Letters, 1961, No. 13, page 448; Gazzetta Chimica Italiana, 93, 431; 1963). This 21-ester is generally present in a relatively low amount but it has been observed that the kind of the starting orthoester and the number of the carbon atoms of the acyl radical as well as the nature of the parent steroid can affect the extent of the formation of said 21-ester.

In order to avoid the resulting 17-monoester being rearranged to the isomeric 21-monoester, it has been suggested that the acid hydrolysis should be carried out under mild conditions, for example by operating at room temperature in the presence of weak acids. Such conditions, however, are not sufficient, as a rule, to avoid the formation of 21-ester and, on the other hand, they can sometimes give rise to incomplete hydrolysis and hence to mixtures containing, besides the desired 17-ester, not negligible amounts of unchanged 17,21-orthoester.

It is therefore an object of this invention to provide an improved method for the commercial production with optimal yield of steroid 17α-monoesters by hydrolysis of the corresponding 17,21-orthoesters.

It has now been found, and this constitutes the principal object of the present invention, that in performing the conversion of 17,21-cyclic orthoesters to 17-esters it is possible in general to reduce to almost negligible percentage and sometimes to avoid the formation of 21-esters as reaction by-products, by carrying out the hydrolysis in a buffered aqueous-organic medium at a definite pH value from about pH 4 to about pH 6 and preferably from pH 4.5 to 5.5.

The medium of the reaction comprises a water-miscible organic solvent and an aqueous solution of a buffer of known hydrogen ions concentration, able to give pH values within the above-defined range. Since the addition of a water-miscible organic solvent to a buffer acid solution causes an increase of the pH value, that is a change of the pH towards the neutrality (the entity of such increase being dependent on the amount of the organic solvent), it will be apparent to one of ordinary skill in the art that the proportion between the organic solvent and the buffer solution of known hydrogen ions concentration will be suitably chosen in order to obtain that the pH of the reaction medium falls within the definite range of from about 4 to about 6.

As water miscible organic solvents there may be used acetone, dioxane, tetrahydrofurane and preferably a lower alkanol from one to four carbon atoms, such as methanol, ethanol, propanol, iso-propanol, n. butanol, iso-butanol and the like.

As a buffer there may be used any buffer solution which gives the desired pH value to the reaction system, for example a solution of an acid salt, such as potassium hydrogen phthalate 0.05M, potassium dihydrogen phosphate 1/115M. Preferred buffer solutions are those made from known quantities of an acid and a salt or from an acid salt and a base, such as buffered mixtures, prepared according to Sorensen and Clark, of: acetic acid 0.1N - sodium acetate 0.1M; hydrochloric acid 0.1N - sodium citrate 0.1M; hydrochloric acid 0.2N - potassium hydrogen phthalate 0.2M; potassium hydrogen phthalate 0.2M - sodium hydroxyde 0.2N; hydrochloric acid 0.1N - glycine 0.1N; and the like. The composition of such buffered mixtures and the resulting pH values are well known in the art. They are reported for ex. in the U. S. Pharmacopoeia XVII Edition; and are described by F. W. Kuster and A. Thiel in Logarithms and Tables, $51^{st}$–$55^{th}$ German Edition, pages 150–155. A particularly suitable buffered aqueous-organic medium is a mixture methanol - acetic acid - sodium acetate, preferably a mixture of 5 volumes of methanol and 2 volumes of an aqueous solution containing 9 parts of 0.1N acetic acid and 1 part of 0.1M sodium acetate. Such a buffered aqueous-organic medium allows the pH of the reaction system to reach the value of about pH 5.

To perform the hydrolysis according to the present invention, the starting 17,21-cyclic orthoester is dissolved or suspended in the chosen organic solvent, the aqueous buffer solution is added to and the resulting reaction mixture is maintained under stirring at room temperature (20°–30°C) or is heated to reflux. Practically the reaction takes place between room temperature and the boiling point of the aqueous-organic medium. The reaction time depends on the temperature and can vary within a rather wide range, i.e. between 20–30 minutes when the reaction is carried out at reflux, and many hours, when the reaction is carried out at room temperature. The improved process of this invention permits to obtain almost constant results without taking particular precautions, since under the controlled acid conditions from about pH 4 to about pH 6 the 17-monoester is formed in a stable condition and does not rearrange to 21-ester.

The advantage of operating in a buffered aqueous-organic medium according to the present invention will become apparent from the results of Table I, where there are reported the percentages of 21-esters which are obtained, in admixture with the desired 17-esters, by hydrolysis of some representative steroid 17,21-orthoesters either in the presence of 2 N oxalic acid according to the method described in Gazzetta Chimica Italiana 93, 413; 1963 (pH value about 2) or in the buffered aqueous-organic medium according to this invention (preferred pH value about 5). The percentage of the 21-ester was evaluated by thin layer chromatography on silica gel (benzene-acetone solvent system 8:2).

TABLE I

|  | % 21-ester in admixture with the desired 17-ester | |
|---|---|---|
| Cortexolone 17,21-methyl orthoacetate | 17 | 3 |
| Prednisolone 17,21-methyl orthoacetate | 22 | 3,5 |
| Hydrocortisone 17,21-methyl orthobutyrate | 25 | 5 |
| Prednisolone 17,21-methyl orthovalerate | 18 | 3 |
| Prednisolone 17,21-methyl orthoenanthate | 12 | 2 |
| Prednisolone 17,21-methyl orthobenzoate | 11 | 1,5–2 |
| Prednisolone 17,21-methyl orthocyclohexancarboxylate | 8 | 1 |
| 9α-Fluoro-prednisolone 17,21-methyl orthovalerate | 16 | 2 |
| Dexamethasone 17,21-methyl orthovalerate | 7 | 1–2 |
| Betamethasone 17,21-methyl orthovalerate | 2 | trace |

From the above results it is apparent that the hydrolysis of the 17,21-cyclic orthoesters according to the method of the prior art gives mixtures of 17-esters and 21-esters wherein the 21-ester may be present at the rate of 10–20 percent, while the hydrolysis at controlled pH according to the present invention allows the amount of by-product to be reduced considerably. Thus, the final product may be isolated in excellent yield and in a pure condition since the little amount of 21-ester which is formed as by-product of the reaction is fully removed by one simple crystallisation.

The controlled acid hydrolysis, according to the present invention, may be carried out on 17,21-cyclic orthoesters of any 17α,21-dihydroxy-20-keto-steroid of the pregnane series to form the corresponding 17-esters in excellent yield.

The terms "orthoester" and "ester", as used herein, embrace those 17,21-oethoesters and those 17-esters deriving from any hydrocarbon carboxylic acid, including alkanoic, cyclo-alkanoic and aryl-alkanoic acids, aromatic and heterocyclic carboxylic acids. Usually the alkanoic acids contain from two to 10 carbon atoms, such as acetic, propionic, butyric, isobutyric, valeric, isovaleric, caproic, enanthic, pelargonic and capric acids; the cycloalkanecarboxylic acids contain from five to seven carbon atoms, such as cyclobutane, cyclopentane, cyclohexane and cycloheptane carboxylic acids; the aryl-alkanoic acids have preferably eight to nine carbon atoms, such as phenylacetic and phenylpropionic, while benzoic acid is particularly preferred among the aromatic carboxylic acids. Other desired orthoester and ester groupings are those deriving from hydrocarbon dicarboxylic acids, such as succinic, oxalic and malonic acids, particularly in the form of mono lower alkyl esters, such as monomethyl and monoethyl succinates, oxalates and malonates.

The 17,21-cyclic orthoesters, starting materials, are generally well known in the art. In the rare instances in which they are not, they can be easily prepared by applying the orthoesterification method described in the U.S. Pat. No. 3,147,249 and in Gazzetta Chimica Italiana 93, 413; 1963.

Typical steroid 17,21-orthoesters which can be converted in almost quantitative yield into the corresponding 17-monoesters by the improved method of this invention are those of therapeutically active steroids, such as, for example, hydrocortisone, 6α-fluoro-hydrocortisone, 9α-fluoro- and 6α,9α-difluoro-hydrocortisone, prednisolone, 6α-fluoroprednisolone, 9α-fluoro-prednisolone, 16α-methyl-prednisolone, 16β-methyl-prednisolone, 16-methylene-prednisolone, 6α,9α-difluoroprednisolone, 6α-fluoro-16α-methylprednisolone, 6α-fluoro-16β-methylprednisolone, 6α-fluoro-16-methylene-prednisolone, 9α-fluoro-16α-methyl-prednisolone, 9α-fluoro-16β-methyl-prednisolone, 6α,9α-difluoro-16α-methyl-prednisolone, 6α,9α-difluoro-16β-methylprednisolone, 6α-methyl-prednisolone, 9α-chloro-hydrocortisone, 9α-chloro-prednisolone, 9α-chloro-16α-methyl-prednisolone, 9α-chloro-16β-methyl-prednisolone, 9-α,11β-dichloro-16α-methyl-Δ¹,⁴-pregnadiene-17α,21-diol-3,20-dione, 6α-fluoro-9α,11β-dichloro-16α-methyl-Δ¹,⁴-pregnadiene-17α,21-diol-3,20-dione, and the like. The 17-monoesters of this class of steroids, especially the 17-alkanoates, have been found to be extremely active as anti-inflammatory agents.

An important group of 17-monoesters which are easily obtained by the improved process of this invention are those of 3,20-diketo- 17α,21-dihydroxy-Δ⁴-pregnenes and Δ¹,⁴-pregnadienes bearing an additional 9(11) double bond, or an epoxy group at the 9β,11β-position. These compounds are useful intermediates for the preparation of corresponding therapeutically active 17-monoesters. Particularly preferred are compounds characterized by the following structural formula:

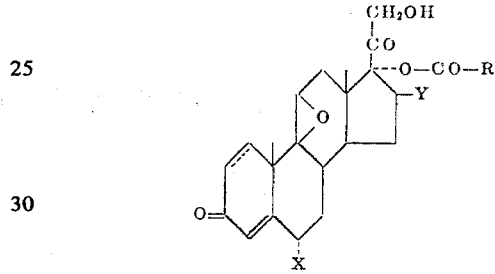

I wherein the dotted line indicates that a double bond may be present in 1,2-position, R represents an alkyl group containing from one to four carbon atoms or phenyl, X represents hydrogen or fluorine, Y represents hydrogen, α-methyl or β-methyl and where at least one of the substituents X and Y is other than hydrogen.

These compounds are prepared by hydrolysis under controlled pH conditions of corresponding 17,21-cyclic orthoesters of formula:

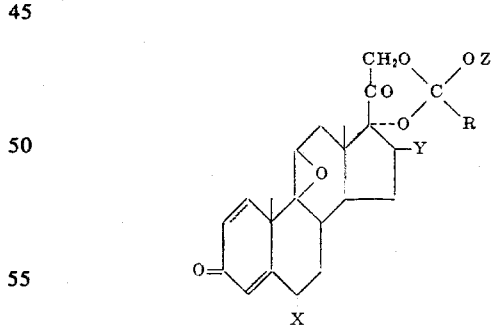

II wherein the dotted line indicates that a double bond may be present in 1,2-position, Z represents methyl or ethyl and R, X and Y have the above stated meaning.

The novel compounds of formula I, which are a further object of this invention, are of great importance as chemical intermediates since, by opening of the 9β,11β-oxide with hydrogen fluoride according to a method well known in the prior art, they afford the corresponding 9α-fluoro-11β-hydroxy derivatives which are known as potent antiinflammatory agents, particularly for topical use.

Representative compounds defined by the formula I are: 9β,11β-oxido-16β-methyl-Δ$^{1,4}$-pregnadiene-17α,21-diol-3,20-dione 17-benzoate; 9β,11β-oxido-16β-methyl-Δ$^{1,4}$-pregnadiene-17α,21-diol-3,20-dione 17-valerate; 9β,11β-oxido-6α-fluoro-Δ$^{1,4}$-pregnadiene-17α,21-diol-3,20-dione 17-propionate; 9β,11β-oxido-6α-fluoro-Δ$^{1,4}$-pregnadiene-17α,21-diol-3,20-dione 17-butyrate; 9β,11β-oxido-6α-fluoro-Δ$^{1,4}$-pregnadiene-17α,21-diol-3,20-dione 17-isobutyrate; 9β,11β-oxido-6-fluoro-Δ$^{1,4}$-pregnadiene-17α,21-diol-3,20-dione 17-valerate; and the corresponding 1,2-dihydro derivatives thereof.

The following examples are illustrative of the method and of the products of this invention and are given for illustrative purposes only.

Preparation of 17,21-Cyclic Orthoester Starting Material

The preparation of a representative 17,21-cyclic orthoester of 9β,11β-epoxy steroid corresponding to Formula I is given below, using the procedure described in the U.S. Pat. No. 3,147,249.

A mixture of 5 g of 9β,11β-oxido-16β-methyl-Δ$^{1,4}$-pregnadiene 17α,21-diol-3,20-dione, 5 cc of dimethylformamide, 5 cc of methyl orthobenzoate and 8 mg of p. toluenesulphonic acid is heated for 20 hours on oil bath at about 100°C while a slow stream of nitrogen is passed through the mixture and the methanol produced as a by-product of the reaction is distilled off. After addition of 2 cc of pyridine to neutralize the acid catalyst, the solvent and the excess of methyl-orthobenzoate are almost completely eliminated under vacuum at moderate temperature. The residue is chromatographed on a column of 200 g of neutral aluminum oxide. By elution with ether-petroleum ether 2.8 g of a crystalline mixture are obtained consisting of 17,21-methyl orthobenzoate of 17α,21-dihydroxy-9β,11β-oxido-16β-methyl-Δ$^{1,4}$-pregadiene-3,20-dione.

This compound may be used without further purification for the conversion into the corresponding 17-monobenzoate.

By recristallization from methanol-ether the 17,21-methyl orthobenzoate of this preparation shows M.P. 184°-186°C, [α]$_D^{20}$ + 42° (dioxane, c=1%).

EXAMPLE 1

To a suspension of 5 g of cortexolone 17,21-methyl-ortho-acetate [17α,21-(1'-methoxy)-ethylidendioxy-Δ$^4$-pregnene-3,20-dione] in 100 cc of methanol, 40 cc of a 9 : 1 mixture of 0.1 N acetic acid and 0.1 M sodium acetate solutions were added. The reaction mixture having pH 5.4 was refluxed for one hour. After concentration under vacuum, the residue was diluted with water, filtered and dried. There was so obtained 4.7 g of cortexolone 17-acetate (Δ$^4$-pregnene-17α,21-diol-3,20-dione 17-acetate), M.P. 196°-201°C, containing about 1.5% of the corresponding 21-acetate and 1% of free alcohol. Yield 98%. By recrystallization from acetone-ether containing a small quantity of methanol, practically pure cortexolone 17-acetate was obtained; M.P. 198°-201°C, [α]$_D^{24}$ = +41° (dioxane, c=1%). Yield 79.9%.

Comparable results were obtained by performing the reaction at 30°-35°C for 48 hours under stirring.

EXAMPLE 2

A suspension of 200 mg of betamethasone 17,21-methyl orthovalerate [17α,21-(1'-methoxy)-n-pentylidenedioxy-9α-fluoro-16β-methyl-Δ$^{1,4}$-pregnadien-11β-ol-3,20-dione] in 10 cc of methanol and 2 cc of a mixture of 49.3 parts of aqueous 0.1 N hydrochloric acid and 50.7 parts of aqueous 0.1 M sodium citrate (final pH value 5.4) was refluxed for one hour. The mixture was then evaporated in vacuo and the residue taken up with water. By filtration, there was obtained 185 mg of betamethasone 17-valerate melting at 185°-186°C. Thin layer chromatography showed that this product contained only traces of the corresponding 21-valerate. After one crystallization from an acetone-hexane mixture, 170 mg of pure betamethasone 17-valerate were obtained; M.P. 186°-189°C [α]$_D^{24}$ = + 76° (dioxane, c=0.5%).

The same results were obtained by effecting the hydrolysis at room temperature (about 30°C) for 30 hours under stirring. This procedure was repeated by using a mixture of 10 cc of methanol and 2 cc of an aqueous solution containing 0.2 N hydrochloric acid (25.75 cc/1) and 0.2 M potassium hydrogen phthalate (250 cc/1) as a buffered aqueous-alcoholic medium.

EXAMPLE 3

A suspension of 5.5 g of hydrocortisone 17,21-methylorthoacetate [17α,21-(1'-methoxy)-ethylidenedioxy-Δ$^4$-pregnen-11β-ol-3,20-dione] in 125 cc of methanol and 50 cc of a mixture of 50.1 parts of 0.1 N hydrochloric acid and 49.9 parts of 0.1 M sodium citrate (final pH value: 5.00) was heated on a water bath until complete solution of the orthoester and then at reflux for 3 hours. The reaction mixture was then evaporated under vacuum and the residue taken up with water. Upon filtration there was obtained 4.8 g of hydrocortisone 17-acetate melting at 233°-237°C. Thin layer chromatography showed that this product contained about 2 percent of the corresponding 21-acetate. After one crystallization from ethyl acetate, 3.5 g of pure hydrocortisone 17-acetate was obtained. M.P. 234°-237°C.

Comparable results were obtained by using a mixture of 125 cc of methanol and 50 cc of an aqueous solution containing 0.2 N hydrochloric acid (21.5 cc/1) and 0.2 M potassium hydrogen phthalate (250 cc/1) as a buffered aqueous-alcoholic medium.

EXAMPLE 4

A suspension of 1 g 17α,21-(1'-methoxy)-ethylidenedioxy-9β,11β-oxido-Δ$^4$-pregnene-3,20-dione in 20 cc of methanol was treated with 8 cc of a 9 : 1 mixture of 0.1 N acetic acid and 0.1 M sodium acetate solutions. The mixture was refluxed on a water bath for 90 minutes then concentrated under reduced pressure. The residue, taken up with water, filtered and dried, afforded 9β,11β-oxido-Δ$^4$-pregnene-17α,21-diol-3,20-dione 17-acetate, containing about 5 percent of corresponding 21-acetate, in 78 percent yield: M.P. 183°-185°C, [α]$_D^{24}$ = − 58.5° (dioxane, C=1%).

After one crystallization from acetone-ethyl ether, pure 9β,11β-oxido-Δ$^4$-pregnen-17α,21-diol-3,20-dione 17-acetate was obtained. M.P. 193°-195°C, [α]$_D$ = − 69° (dioxane, c=1%).

By hydrolysing the same starting product with 2 N oxalic acid according to the method described in Gazzetta Chimica Italiana, 93, 413 (1963) a material was obtained melting at 167°-171°C, [α]$_D$ = −39° (dioxane, c=1%), which on thin layer chromatography showed to consist of a mixture of 9β,11β-oxido-Δ$^4$-pregnene- 17α,21-diol-3,20-dione 17-acetate and 21-acetate in the ratio 7:3 as well as of the 3 percent of the corresponding 17,21-dihydroxy compound.

Analogous results were obtained by hydrolysing the 17α,21-(1'-methoxy)-ethylidenedioxy-9β,11β-oxido-Δ¹,⁴-pregnadiene-3,20-dione.

EXAMPLE 5

To a suspension of 1 g of 17α,21-(1'-methoxy)-benzylidenedioxy-9β,11β-oxido-16β-methyl-Δ⁴-pregnene-3,20-dione in 20 cc of methanol, 8 cc of a 9 : 1 mixture of 0.1 N acetic acid and 0.1 M sodium acetate solutions was added. The mixture was refluxed on a water bath for 90 minutes then concentrated under reduced pressure. The residue, taken up with water, filtered and dried, afforded 9β,11β-oxido-16β-methyl-Δ⁴-pregnene-17α,21-diol-3,20-dione 17-benzoate containing the corresponding 21-benzoate in an amount less than 1 percent.

EXAMPLE 6

To a suspension of 5 g of 17α,21-(1'-methoxy)-benzylidenedioxy-9β,11β-oxido-16β-methyl-Δ¹,⁴-pregnadiene-3,20-dione in 200 cc of methanol, 80 cc of a 9 : 1 mixture of 0.1 N acetic acid and 0.1 M sodium acetate solutions was added. The mixture was refluxed on a water bath for 90 minutes, then concentrated under reduced pressure. The residue, taken up with water, filtered and dried, afforded 4,355 g of 9β,11β-oxido-16β-methyl-Δ¹,⁴-pregnadiene-17α,21-diol-3,20-dione 17-benzoate containing the corresponding 21-benzoate in an amount less than 1 percent; $\lambda_{max}$ 234–235 mμ, $E^{1\%}_{1cm} = 471$.

9β,11β-oxido-16β-methyl-Δ¹,⁴-pregnadiene-17α,21-diol-3,20-dione 17-benzoate is a novel intermediate of great practical importance, because it can be easily converted into betamethasone 17-benzoate (which is a compound very active as an antiinflammatory agent, particularly for topical use) according to the following procedure:

A solution of 400 mg of 9β,11β-oxido-16β-methyl-Δ¹,⁴-pregnadiene-17α,21-diol-3,20-dione 17-benzoate in 5 cc of chloroform is cooled to −50°C and treated with 5 cc of a 17 percent by weight solution of anhydrous hydrogen fluoride in tetrahydrofurane. The solution is kept at −30° to −20°C for 3 hours, then poured into an aqueous solution of potassium carbonate. The organic phase is separated and washed with a saturated sodium chloride solution. After complete elimination of the solvent, the residue is taken up with ether and filtered to give betamethasone 17-benzoate, M.P. 225°–231°C, $[\alpha]_D^{22} = + 62 \pm 2°$ (dioxane, c=1%).

In an analogous manner, by hydrolysing the 17α,21-(1'-methoxy)-n-pentylidenedioxy-9β,11β-oxido-16β-methyl-Δ¹,⁴-pregnadiene-3,20-dione with a mixture of 5 volumes of methanol and 2 volumes of an aqueous solution containing 9 parts of 0.1 N acetic acid and 1 part of 0.1 M sodium acetate, 9β,11β-oxido-16β-methyl-Δ¹,⁴-pregnadiene-17α,21-diol-3,20-dione 17-valerate, containing the corresponding 21-valerate in an amount less than 2 percent, was obtained in practically quantitative yield. This compound, treated with hydrogen fluoride as set forth above, yielded betamethasone 17-valerate; M.P. 186°–189°C; $[\alpha]_D^{22} = + 77°$ (dioxane, c=0.5%).

EXAMPLE 7

To a suspension of 10 g of 17α,21-(1'-methoxy)-n-butylidenedioxy-9β,11β-oxido-6α-fluoro-Δ¹,⁴-pregnadiene-3,20-dione in 200 cc of methanol 80 cc of a 9 : 1 mixture of 0.1 N acetic acid and 0.1 M sodium acetate solutions was added. The reaction mixture was refluxed for 1 hour. After concentration under vacuum, the residue was diluted with water, filtered and dried. 9β,11β-oxido-6α-fluoro-Δ¹,⁴-pregnadiene-17α,21-diol-3,20-dione 17-butyrate, containing the corresponding 21-butyrate in an amount less than 3 percent, was so obtained in practically quantitative yield. The compound thus obtained, subjected to a treatment with hydrogen fluoride as set forth in Example 6, afforded 6α,9α-difluoroprednisolone 17-butyrate, a potent antiinflammatory agent.

In an analogous manner, the 17-propionate, the 17-iso-butyrate and the 17-valerate of 9β,11β-oxido-6α-fluoro-Δ¹,⁴-pregnadiene-17α,21-diol-3,20-dione, containing less than 3 percent of the corresponding 21-esters, were obtained. These intermediates, treated with hydrogen fluoride as set forth in Example 6, yielded the 17-propionate, the 17-isobutyrate and the 17-valerate of 6α,9α-difluoroprednisolone which compounds possess valuable antiinflammatory properties.

EXAMPLE 8

To a suspension of 2 g of 17α,21-(1'-methoxy)-benzylidenedioxy-16β-methyl-Δ⁴,⁹⁽¹¹⁾-pregnadiene-3,20-dione in 60 cc of methanol, 24 cc of a 9 : 1 mixture of 0.1 N acetic acid and 0.1 M sodium acetate solutions was added. The mixture was refluxed for 3 hours, then concentrated under reduced pressure. The residue, taken up with water, filtered and dried, yielded 1.79 g (92.5 percent of the theoretical) of 16β-methyl-Δ⁴,⁹⁽¹¹⁾-pregnadiene-17α,21-diol-3,20-dione 17-benzoate which on thin layer chromatography showed only one spot; M.P. 233°–235°C.

This intermediate may be converted into betamethasone 17-benzoate by the conventional steps of: introduction of a double bond at the 1-position, epoxidation of the double bond of the 9(11) position and subsequent cleavage of the resultant 9β,11β-epoxide with hydrogen fluoride according to the procedure described in Example 6.

EXAMPLE 9

To a suspension of 5 g of 17α,21-(1'-methoxy)-benzylidenedioxy-Δ¹,⁴-pregnadien-11β-ol-3,20-dione in 200 cc of methanol, 80 cc of a 9 : 1 mixture of 0.1 N acetic acid and 0.1 M sodium acetate was added. By operating as described in Example 8, prednisolone 17-benzoate, which on thin layer chromatography showed only one spot, was obtained in 95 percent yield. After one crystallization from an acetone-diethyl ether mixture, the product melted at 242°–244°C, $[\alpha]_D^{24} = -21.5 \pm 1.5°$ (dioxane, c=1%). The same results were obtained by operating in a buffered aqueous-organic medium consisting of 125 cc of methanol and 50 cc of a hydrochloric acid-sodium citrate or hydrochloric acid-potassium hydrogen phthalate mixture as set forth in Example 3.

Prednisolone 17-benzoate exhibits by parenteral route a very prolonged antiinflammatory activity and it is particulary useful for the systemic treatment of inflammatory and allergic conditions. The product can be prepared in the form of injectable solutions or suspensions and can be administered by subcutaneous or intra-articular way at doses ranging from 1 to 40 mg, preferably from 2.5 to 20 mg, dissolved or suspended in a suitable vehicle, such as water, an alcohol, a glycol, a vegetable oil or their mixtures.

EXAMPLE 10

Operating as previously described the following compounds were obtained: $11\beta,17\alpha,21$-trihydroxy-$\Delta^{1,4}$-pregnadiene-3,20-dione 17-(2'-carbethoxyacetate), by hydrolysis of $11\beta$-hydroxy-$17\alpha,21$-(1'-ethoxy-2'-carbethoxyethylidenedioxy)-$\Delta^{1,4}$-pregnadiene-3,20-dione. M.P. 170°–174°C; $[\alpha]_D = +66°$, (dioxane, $c=1\%$) $11\beta,17\alpha,21$-trihydroxy-$\Delta^{1,4}$-pregnadiene-3,20-dione 17-hemimalonate by hydrolysis of $11\beta$-hydroxy-$17\alpha,21$-(1'-ethoxy-2'-carboxyethylidenedioxy)-$\Delta^{1,4}$-pregnadiene-3.20-dione. M.P. 180°–184°C; $[\alpha]_D = +71.2°$, (dioxane, $c=1\%$).

$9\alpha$-fluoro-$11\beta,17\alpha,21$-trihydroxy-$16\beta$-methyl-$\Delta^{1,4}$-pregnadiene-3,20-dione 17-(2'-carbethoxyacetate) by hydrolysis of $9\alpha$-fluoro-$11\beta$-hydroxy-$17\alpha,21$-(1'-ethoxy-2'-carbethoxy-ethylidenedioxy)-$16\beta$-methyl $\Delta^{1,4}$-pregnadiene-3,20-dione. M.P. 180°–185°C; $[\alpha]_D = +68.6°$, (dioxane, $c=1\%$).

$9\alpha$-fluoro-$11\beta,17\alpha,21$-trihydroxy-$16\beta$-methyl-$\Delta^{1,4}$-pregnadiene-3,20-dione 17-hemimalonate by hydrolysis of $9\alpha$-fluoro-$11\beta$-hydroxy-$17\alpha,21$-(1'-ethoxy-2'-carboxyethylidenedioxy)-$16\beta$-methyl-$\Delta^{1,4}$-pregnadiene-3,20-dione. M.P. 192°–194°C; $[\alpha]_D = +84°$, (dioxane, $c=1\%$).

$11\beta,17\alpha,21$-trihydroxy-$\Delta^{1,4}$-pregnadiene-3,20-dione 17-(1'-carbomethoxyformate)-$11\beta$-hydroxy-$17\alpha,21$-(1'-methoxy-1'-carbomethoxymethylenedioxy)-$\Delta^{1,4}$-pregnadiene-3,20-dione. M.P. 210°–215°C; $[\alpha]_D = +76.7°$ (dioxane, $c=1\%$).

$11\beta,17\alpha,21$-trihydroxy-$\Delta^{1,4}$-pregnadiene-3,20-dione 17-hemioxalate by hydrolysis of $11\beta$-hydroxy-$17\alpha,21$-(1'-methoxy-1'-carboxymethylenedioxy)-$\Delta^{1,4}$-pregnadiene-3,20-dione, potassium salt. M.P. 300°–305°C; $[\alpha]_D = +71.2$ (water, $c=0.5\%$)

$9\alpha$-fluoro-$11\beta,17\alpha,21$-trihydroxy-$16\beta$-methyl-$\Delta^{1,4}$-pregnadiene-3,20-dione 17-(1'-carbomethoxyformate) by hydrolysis of $9\alpha$-fluoro-$11\beta$-hydroxy-$17\alpha,21$-(1'-methoxy-1'-carbomethoxy-methylenedioxy)-$16\beta$-methyl-$\Delta^{1,4}$-pregnadiene-3,20-dione. M.P. 220°–228°C; $[\alpha]_D = +101.3°$, (dioxane, $c=1\%$).

$9\alpha$-fluoro-$11\beta,17\alpha,21$-trihydroxy-$16\beta$-methyl-$\Delta^{1,4}$-pregnadiene-3,20-dione 17-hemioxalate by hydrolysis of $9\alpha$-fluoro-$11\beta$-hydroxy-$17\alpha,21$-(1'-methoxy-1'-carboxymethylenedioxy)-$16\beta$-methyl-$\Delta^{1,4}$-pregnadiene-3,20-dione. M.P. 160°–165°C; $[\alpha]_D = +98°$, (dioxane, $c=1\%$).

EXAMPLE 11

A suspension of 2.5 g of prednisolone 17,21-methyl ortho-cyclohexancarboxylate in 70 cc of methanol was treated with 28 cc of a mixture of 50.1 parts of 0.1 N hydrochloric acid and 49.9 parts of 0.1 M sodium citrate, the pH value of this medium being about 4.9. The reaction mixture was maintained under stirring at room temperature (about 30°C) for 20 hours, then was concentrated under vacuum and the residue taken up with water, filtered and dried. The product examined on thin layer chromatography showed to be almost pure prednisolone 17-cyclohexancarboxylate (yield 99 percent) containing less than 1 percent of the corresponding 21-cyclohexancarboxylate.

The same hydrolysis carried out at about pH 2 with 2 N oxalic acid gave a 17-cyclohexancarboxylate containing about 8 percent of the corresponding 21-ester.

EXAMPLE 12

$17\alpha,21$-(1'-methoxy)-benzylidenedioxy-$16\beta$-methyl-$\Delta^{1,4,9(11)}$-pregnatriene-3,20-dione was hydrolyzed following the procedure of Example 8 to obtain $16\beta$-methyl-$\Delta^{1,4,9(11)}$-pregnatriene $17\alpha,21$-diol-3,20-dione 17-benzoate which on thin layer chromatography showed only one spot.

This compound may be converted by epoxidation, according to the method described by Taub et al. in J. Am. Chem. Soc. 82, pp. 4012–4026 (1960), into $9\beta,1$-$1\beta$-oxido-$16\beta$-methyl-$\Delta^{1,4}$-pregnadiene-$17\alpha,21$-diol-3,20-dione 17-benzoate, the compound of Example 6.

We claim:

1. In a process for the preparation of 17-monoesters of $17\alpha,21$-dihydroxy-20-ketosteroids of the pregnane series which process comprises subjecting to acid hydrolysis the corresponding 17,21-cyclic orthoesters, the improvement wherein the hydrolysis of said 17,21-cyclic orthoesters of $17\alpha,21$-dihydroxy-20-ketosteroids is conducted in a buffered aqueous-organic medium at a pH within the range between about pH 4 and about pH 6, utilizing a buffer system selected from the group consisting of 0.1N acetic acid and 0.1M sodium acetate; 0.1N hydrochloric acid and 0.1M sodium citrate; 0.2N hydrochloric acid and 0.2M potassium hydrogen phthalate; 0.2M potassium hydrogen phthalate and 0.2N sodium hydroxide; 0.1N hydrochloric acid and 0.1N glycine; and 0.05M potassium hydrogen phthalate and 1/15M potassium dihydrogen phosphate.

2. A process as claimed in claim 1 in which the pH of said buffered aqueous-organic medium is from 4.5 to 5.5.

3. A process as claimed in claim 1 in which an aqueous solution of 0.1N acetic acid and 0.1M sodium acetate is used as a buffer.

4. A process as claimed in claim 1 in which an aqueous solution of 0.1N hydrochloric acid and 0.1M sodium citrate is used as a buffer.

5. A process as claimed in claim 1 in which an aqueous solution of 0.2N hydrochloric acid and 0.2M potassium hydrogen phthalate is used as a buffer.

6. A process as claimed in claim 3 in which a mixture of 5 volumes of methanol and 2 volumes of an aqueous solution containing 9 parts of 0.1N acetic acid and 1 part of 0.1M sodium acetate is used as a buffered aqueous-organic medium.

7. A process for the preparation of $17\alpha$-acetoxy-$\Delta^4$-pregnen-21-ol-3,20-dione which comprises hydrolysing the $17\alpha,21$-(1'-methoxy)-ethylidenedioxy-$\Delta^4$-pregnene-3,20-dione in a buffered aqueous-organic medium having a pH in the range of from 4.5 to 5.5, utilizing a buffer system selected from the group consisting of 0.1N acetic acid and 0.1M sodium acetate; 0.1N hydrochloric acid and 0.1M sodium citrate; 0.2N hydrochloric acid and 0.2M potassium hydrogen phthalate; 0.2M potassium hydrogen phthalate and 0.2N sodium hydroxide; 0.1N hydrochloric acid and 0.1N glycine; and 0.05M potassium hydrogen phthalate and 1/15M potassium dihydrogen phosphate.

8. A process for the preparation of 17-esters of 17,2-1-dihydroxy-3,20-diketo-$\Delta^4$-pregnenes and $\Delta^{1,4}$- pregnadienes bearing a 9(11) double bond or an epoxy group at the 9β,11β-position which comprises hydrolysing a corresponding 17,21-cyclic orthoester in a buffered aqueous-organic medium having a pH in the range of from 4.5 to 5.5, utilizing a buffer system selected from the group consisting of 0.1N acetic acid and 0.1M sodium acetate; 0.1N hydrochloric acid and 0.1M sodium citrate; 0.2N hydrochloric acid and 0.2M potassium hydrogen phthalate; 0.2M potassium hydrogen phthalate and 0.2N sodium hydroxide; 0.1N hydrochloric acid and 0.1N glycine; and 0.05M potassium hydrogen phthalate and 1/15M potassium dihydrogen phosphate.

9. A process for the preparation of a compound of formula:

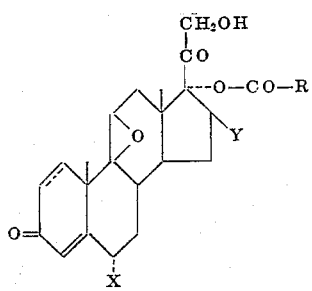

wherein the dotted line indicates the presence of a single or double bond in 1,2 position, R represents an alkyl group containing from one to four carbon atoms or phenyl, X represents hydrogen or fluorine, Y represents hydrogen, α-methyl or β-methyl and at least one of the substituents X and Y is other than hydrogen, which comprises hydrolysing a compound of formula:

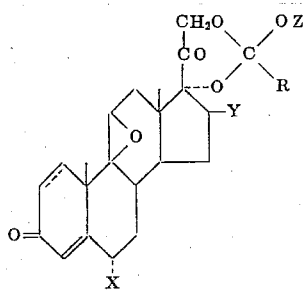

wherein the dotted line indicates the presence of a single or double bond in 1,2 position, Z represents methyl or ethyl and X, Y and R have the above stated meaning, in a buffered aqueous-organic medium having a pH within the range from about 4 to about 6, utilizing a buffer system selected from the group consisting of 0.1N acetic acid and 0.1M sodium acetate; 0.1N hydrochloric acid and 0.1M sodium citrate; 0.2N hydrochloric acid and 0.2M potassium hydrogen phthalate; 0.2M potassium hydrogen phthalate and 0.2N sodium hydroxide; 0.1N hydrochloric acid and 0.1N glycine; and 0.05M potassium hydrogen phthalate and 1/15M potassium dihydrogen phosphate.

10. A process as claimed in claim 9 in which the pH of said buffered aqueous-organic medium is from 4.5 to 5.5.

11. A process as claimed in claim 9 in which the starting 17,21-orthoester is 17α,21-(1'-methoxy)-benzylidenedioxy-9β,11β-oxido-16β-methyl-Δ⁴-pregnene-3,20-dione and the product of the hydrolysis is the 17-benzoate of 9β,11β-oxido-16β-methyl Δ⁴-pregnene-17α,21-diol-3,20-dione.

12. A process as claimed in claim 9 in which the starting 17,21-orthoester is 17α,21-(1'-methoxy)-benzylidenedioxy-9β,11β-oxido-16β-methyl-Δ¹,⁴-pregnadiene-3,20-dione and the product of the hydrolysis is the 17-benzoate of 9β,11β-oxido-16β-methyl-Δ¹,⁴-pregnadiene-17α,21-diol-3,20-dione.

13. A compound of formula:

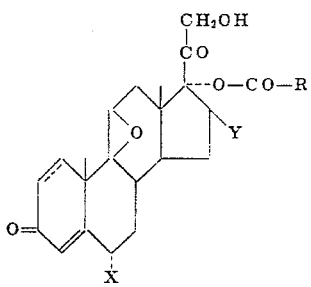

wherein R represents an alkyl group containing from one to four carbon atoms or phenyl, X represents hydrogen or fluorine, Y represents hydrogen, α-methyl or β-methyl and at least one of the substituents X and Y is other than hydrogen.

14. 9β,11β-oxido-16β-methyl-Δ¹,⁴-pregnadiene-17α,21-diol-3,20-dione 17-benzoate.
15. 9β,11β-oxido-16β-methyl-Δ¹,⁴-pregnadiene-17α,21-diol-3,20-dione 17-valerate.
16. 9β,11β-oxido-6α-fluoro-Δ¹,⁴-pregnadiene-17α,21-diol-3,20-dione 17-propionate.
17. 9β,11β-oxido-6α-fluoro-Δ¹,⁴-pregnadiene-17α,21-diol-3,20-dione 17-butyrate.
18. 9β,11β-oxido-6α-fluoro-Δ¹,⁴-pregnadiene-17α,21-diol-3,20-dione 17-isobutyrate.
19. 9β,11β-oxido-6α-fluoro-Δ¹,⁴-pregnadiene-17α,21-diol-3,20-dione 17-valerate.

20. A process for the preparation of prednisolone 17-benzoate which comprises hydrolysing 17α,21-(1'-lower alkyl)-benzylidenedioxy-Δ¹,⁴-pregnadien 11β-ol-3,20-dione in a buffered aqueous-organic medium having a pH value from about 4 to about 6, utilizing a buffer system selected from the group consisting of 0.1N acetic acid and 0.1M sodium acetate; 0.1N hydrochloric acid and 0.1M sodium citrate; 0.2N hydrochloric acid and 0.2M potassium hydrogen phthalate; 0.2M potassium hydrogen phthalate and 0.2N sodium hydroxide; 0.1N hydrochloric acid and 0.1N glycine; and 0.05M potassium hydrogen phthalate and 1/15M potassium dihydrogen phosphate.

* * * * *

UNITED STATES PATENT OFFICE
CERTIFICATE OF CORRECTION

Patent No. 3,755,302　　　　　Dated August 28, 1973

Inventor(s) Alberto Ercoli, Rinaldo Gardi and Romano Vitali

It is certified that error appears in the above-identified patent and that said Letters Patent are hereby corrected as shown below:

Column 2, line 12, "1/115 M" should read -- 1/15 M --.

Column 3, Table I, the heading should be completed as follows:

TABLE I

% 21-ester in admixture with the desired 17-ester should be

TABLE I

| Starting orthoester | % 21-ester in admixture with the desired 17-ester | |
|---|---|---|
| | pH~2 | pH~5 |

UNITED STATES PATENT OFFICE
CERTIFICATE OF CORRECTION

Patent No. 3,755,302                    Dated August 28, 1973

Inventor(s) Alberto Ercoli, Rinaldo Gardi and Romano Vitali
                                                    (page 2)

It is certified that error appears in the above-identified patent and that said Letters Patent are hereby corrected as shown below:

Column 5, line 37, "-$\Delta^{1,4}$-pregadiene" should read -- -$\Delta^{1,4}$-pregnadiene --.

Column 9, line 34 in Example 10, "7-(1'-carbomethoxyformate)-11β-hydroxy-" should read -- 7-(1'-carbomethoxyformate) from 11β-hydroxy- --.

Column 12, Claim 13, a definite double bond (rather than an optional double bond) should be inserted in the 1-2 position of the formula as follows:

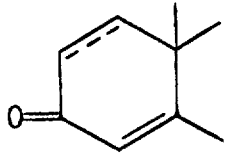          should be          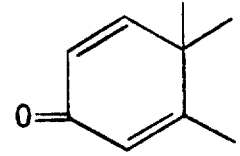

Signed and sealed this 30th day of April 1974.

(SEAL)
Attest:

EDWARD M. FLETCHER, JR.                C. MARSHALL DANN
Attesting Officer                      Commissioner of Patents